United States Patent [19]
Biles et al.

[11] Patent Number: 6,049,040
[45] Date of Patent: *Apr. 11, 2000

[54] UNIVERSAL CABLE GUIDE

[76] Inventors: Scott Douglas Biles, 12604 Patton Creek, Broomfield, Colo. 80020; William Henry Biles, III, 892 W. 101st Ave., Northglenn, Colo. 80218; Robert Gardner Kortum, 2601 Center Ave., Cody, Wyo. 82414

[ * ] Notice: This patent issued on a continued prosecution application filed under 37 CFR 1.53(d), and is subject to the twenty year patent term provisions of 35 U.S.C. 154(a)(2).

[21] Appl. No.: 08/932,436

[22] Filed: Sep. 17, 1997

[51] Int. Cl.⁷ .............................. H02G 3/00; H02G 3/04; H02G 3/24
[52] U.S. Cl. .......................... 174/68.3; 174/68.1; 174/97; 174/48; 174/101
[58] Field of Search .................................. 174/68.3, 101, 174/97, 72 C, 68.1, 48, 135

[56] References Cited

U.S. PATENT DOCUMENTS

| | | | |
|---|---|---|---|
| 982,764 | 1/1911 | Burk | 174/97 |
| 4,911,510 | 3/1990 | Jenkins | 350/96.1 |
| 4,911,517 | 3/1990 | Newell et al. | 350/96.2 |
| 4,922,510 | 5/1990 | Jenkins | 350/96.1 |
| 5,092,663 | 3/1992 | Hivner | 385/100 |
| 5,115,260 | 5/1992 | Hayward et al. | 385/100 |
| 5,513,295 | 4/1996 | Go | 385/137 |
| 5,530,787 | 6/1996 | Arnett | 385/137 |
| 5,550,713 | 8/1996 | Pressler et al. | 361/818 |
| 5,566,268 | 10/1996 | Radliff et al. | 385/137 |
| 5,753,855 | 5/1998 | Nicoli et al. | 174/49 |
| 5,929,380 | 7/1999 | Carlson, Jr. et al. | 174/68.3 |
| 5,939,680 | 8/1999 | Gretz et al. | 174/135 |

FOREIGN PATENT DOCUMENTS

| | | | |
|---|---|---|---|
| 390504A1 | 2/1989 | Germany | H02B 1/20 |
| 51-2715 | 1/1979 | Japan | G02B 5/14 |

OTHER PUBLICATIONS

1996–1997 Product catalog for Telecrafter Products, 12687 West Cedar Drive, Lakewood, CO 80228. 18 pages.

*Primary Examiner*—Kristine Kincaid
*Assistant Examiner*—Mark Olds
*Attorney, Agent, or Firm*—Duft,Graziano&Forest,P.C.

[57] ABSTRACT

The universal cable guide comprises a body of predetermined multi-dimensional shape, having a cable receiving channel formed in a major surface thereof and along its length. A primary cable guide fastening element is formed as an integral part of the body and located along an edge of the body to receive fasteners to secure the universal cable guide to a surface. A plurality of apertures are formed along the length of the body in a predetermined pattern to receive either fasteners to secure the universal cable guide to a surface or to receive fasteners to secure a mating cable protection element which can be placed on the top of the body. The mating cable protection element can be formed to cover the top surface of the body. This cable protection element can include apertures formed therein that match the plurality of apertures formed in the body to enable fasteners to be used to secure the two elements together and to a surface, or can be formed with integral fasteners which mate with the corresponding plurality of apertures formed in the body. The interconnection of the body and cable protection element form the resultant channel in which the communication cable is secured and protected.

9 Claims, 3 Drawing Sheets

UNIVERSAL CABLE GUIDE

FIELD OF THE INVENTION

This invention relates to communication cable mounting apparatus and, in particular, to a universal cable guide apparatus for the precise placement and protection of a communication cable in an outside plant installation.

It is a problem in the field of communication cable installation to ensure the precise placement of the communication cable without the possibility of damage to the communication cable by the provision of tight bends, or inappropriate use of fasteners, or inadequate support to the communication cable. The communication cable can be conventional telephone cable having a plurality of copper conductors, coaxial cable, optical fiber, or the like. In all of these applications, the minimum radius of curvature of the communication cable is well defined, and bending the communication cable in a tighter bend can cause damage to the communication medium housed within the cable. The installation of communication cables in an outside plant environment is typically accomplished in part by fastening the communication cable to a surface, such as a building wall, by means of fasteners, such as wire nails or screws. The improper use of the fasteners can itself damage the communication cable. The installer of communication cable is thus faced with the problem of routing the communication cable over surfaces, which typically include sharp bends, without over bending the communication cable, yet also securing the communication cable to these surfaces in a manner to ensure protection from damage. To assist the installer with this task, a number of types of fastener apparatus have been developed.

Existing communication cable fastener apparatus includes a fiber optic cable clamp disclosed in U.S. Pat. No. 4,911,517, which compresses the optical fiber and grips it securely. This fastener apparatus consists of a housing which has a channel formed therein, which channel includes a cable stop to position the end of the cable at a predetermined position in the channel. A cable clamp is provided in the housing, movable perpendicular to the length of the cable to engage and compress the plastic coating of the optical fiber to secure the optical fiber in position in the channel.

U.S. Pat. No. 4,911,510 discloses a corner guide comprising a pair of hinged panels with an embedded duct formed therein through which an optical fiber can be threaded. The duct guides the optical fiber along a three-dimensional path to bend the optical fiber around a corner whose radius of curvature is less than that permissible for the optical fiber.

U.S. Pat. No. 5,092,663 discloses an apparatus for supporting and maintaining slack in a communication cable that is mounted in an aerial installation. This apparatus comprises an elongate channel member having an arcuate section and a plurality of linear sections for receiving the slack in the communication cable. A support apparatus is also provided to secure the communication cable to a messenger cable support structure.

U.S. Pat. No. 5,513,295 discloses an optical fiber holding apparatus which comprises a rod having a slot formed therein along its length to receive an optical fiber. A rectangular shaped retainer fits into the slot to secure the optical fiber in place therein.

U.S. Pat. No. 5,530,787 discloses an optical fiber guide having a curved surface with a radius of curvature greater than the critical radius of the optical fiber. A plurality of fingers extend from the curved surface of the guide to hold the optical fiber loosely yet in close proximity to the curved surface of the guide. No protection is provided to the optical fiber, since it is simply looped through the plurality of fingers.

U.S. Pat. No. 5,566,268 discloses a strain relief for communication cable which comprises a rectangular-shaped block having a plurality of parallel-oriented channels formed in a major surface thereof. The channels are sized and shaped to receive either a ribbon cable or a cylindrical shaped cable. The channels each contain a plurality of constrictions to secure the communication cable once inserted into the channel without deforming the communication cable.

German Patent No. DE 39 05 004 A1 discloses a strain relief for electrical cables which comprises a rectangular-shaped block having a plurality of parallel-oriented channels formed in a major surface thereof. The channels are sized and shaped to receive a cylindrical shaped electrical cable. The sides of the channels are sloped inwardly to secure the electrical cable once inserted into the channel.

Japanese Published Patent Application, Serial No. 55-95905, discloses a plurality of optical cable holding members, each of which is formed to securely hold a cylindrical-shaped cable. The basic design of these cable holding members comprises a hollow, cylindrical-shaped body having a slit along its length. The interior opening of the body is sized to receive the cable. The slit is sized to be smaller than the cable to ensure that the cable is gripped by the sides of the hollow formed in the body. The cylindrical-shaped body is formed with a flat backing support surface, which extends beyond the extent of the body to enable the support surface to be used to secure the cable holding member to a surface. In other embodiments, slits are cut into the backing support surface to enable the cable holding member to be bent in a curve or the entire assembly is formed in a curved shape to thereby reroute the cable in another direction.

The difficulty with all of the existing cable guides and fasteners is that they are expensive to fabricate and are therefore typically used only in critical applications. In addition, many of these cable guides and-fasteners provide limited protection to the cable that is being secured, with an opening in the cable guide or fastener exposing the cable to the ambient environment. Thus, the cable guides have found limited use in the field of outside plant wiring due to their cost and limited efficacy. The typical communication cable installation is therefore the use of wire nails to secure the exposed communication cable to a surface, with the curvature of the communication cable being determined on an ad-hoc basis by the installer.

BRIEF SUMMARY OF THE INVENTION

The above described problems are solved and an advance in the field achieved by the present universal cable guide which implements an inexpensive, and simple to use cable placement apparatus for guiding a communication cable through a predetermined multidimensional path. In particular, the present universal cable guide is formed as an integral structure which includes the cable guide aperture, mounting features and optional cable protection features.

In one embodiment of the universal cable guide, the apparatus comprises a body of predetermined multi-dimensional shape, having at least one cable receiving channel formed in a major surface of and along the length of the body. The communication cable comprises a longitudinally oriented element that typically comprises a communication medium which is enclosed in an outer housing of protective material. Examples of such communication cables include, but are not limited to: coaxial cable, optical fiber, waveguide, and the like. A primary cable guide fastening element is integrally formed as part of the body and along an outer edge of the body to receive fasteners to secure the universal cable guide to a surface. A plurality of apertures or clamp features are formed along the length of the body in a predetermined pattern to receive either fasteners to secure the universal cable guide to a surface and/or to receive fasteners to secure a mating cable protection element which can be placed on the top of the body to enclose the communication cable in the channel. A mating cable protection element can be formed, either as a separate piece, or a replica of the above-noted body, or as an attachment to the above-noted body, to cover the top surface of the body. This cable protection element can include apertures formed therein that match the plurality of apertures formed in the body to enable fasteners to be used to secure the two elements together and to a surface, or can be formed with integral fasteners which mate with the corresponding plurality of apertures/clamp features formed in the body.

Thus, the universal cable guide can be inexpensively formed as a single molded element of arbitrary shape and length, with an aperture that receives the cable, to guide the cable along a predefined multi-dimensional path. The fastening of the universal cable guide to a surface is accomplished by the use of a primary cable guide fastening element and additional features are provided to either provide further fastening features or to enable the placement of a cable protection element on the top of the universal cable guide to thereby protect the cable secured therein.

DETAILED DESCRIPTION

In the field of communication cable mounting apparatus, two primary concerns are the precise placement and protection of a communication cable in an outside plant installation. Any apparatus used to perform these functions must be inexpensive to fabricate, simple to use, and reliable. A major impediment to the development of such an apparatus has been the cost of manufacture, since existing communication cable mounting apparatus are complex in structure. The present universal communication cable guide is simple in structure, simple to use and adaptable to a plurality of implementations without necessitating significant structural changes to the basic architecture.

Figure 1:
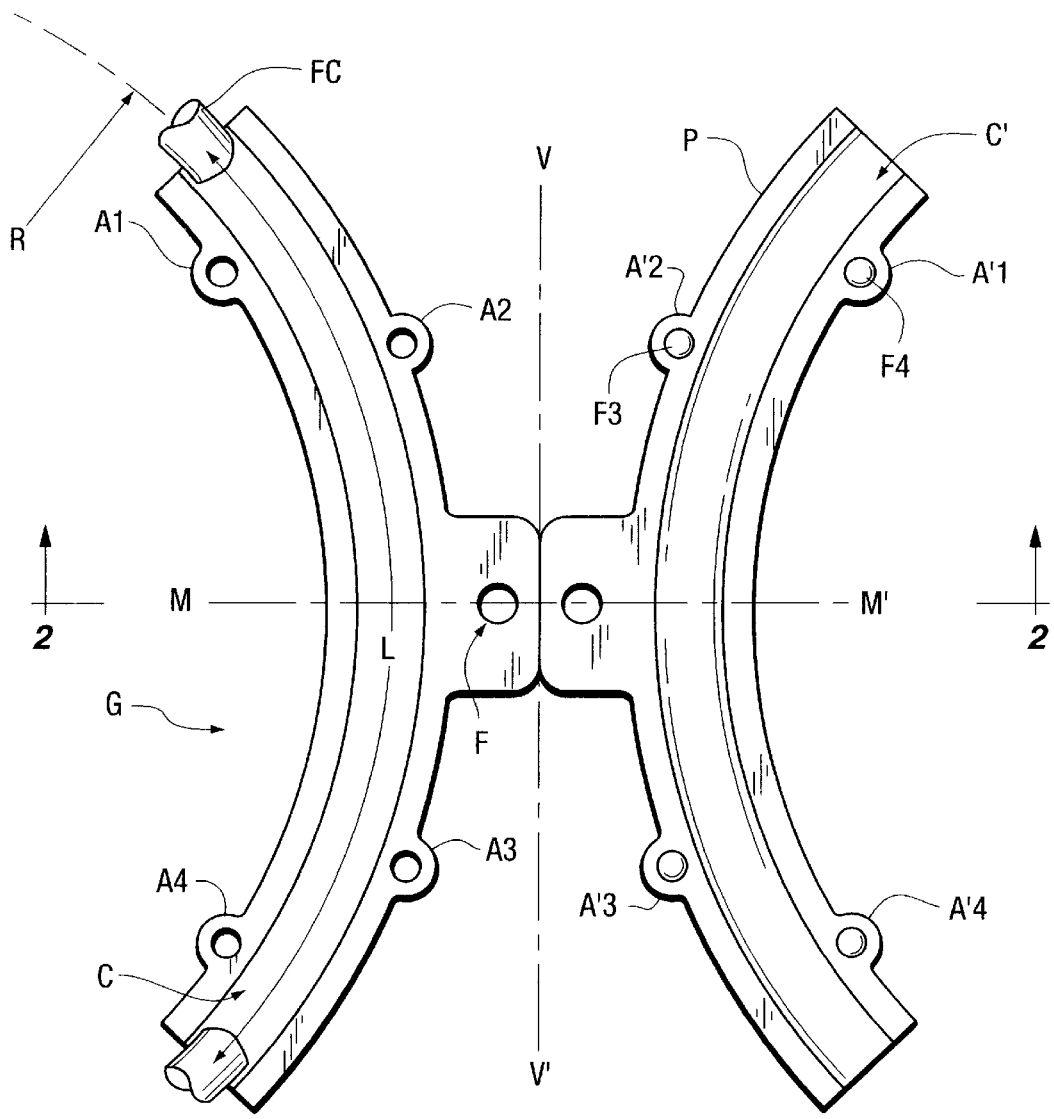
FIGS. 1 and 3 illustrate top plan views of two embodiments of the present universal cable guide.
Figure 2:
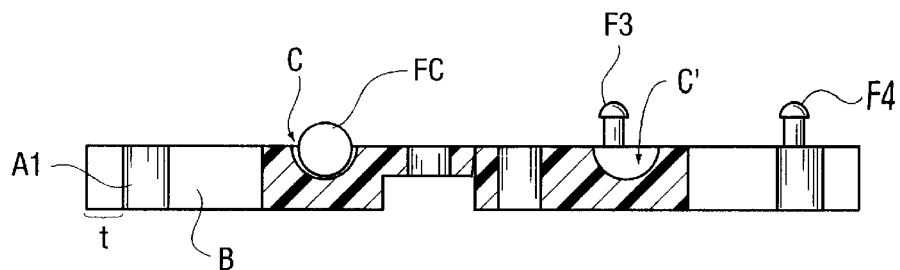
FIGS. 2 and 4 illustrate end plan views of two embodiments of the present universal cable guide.
Figure 3:
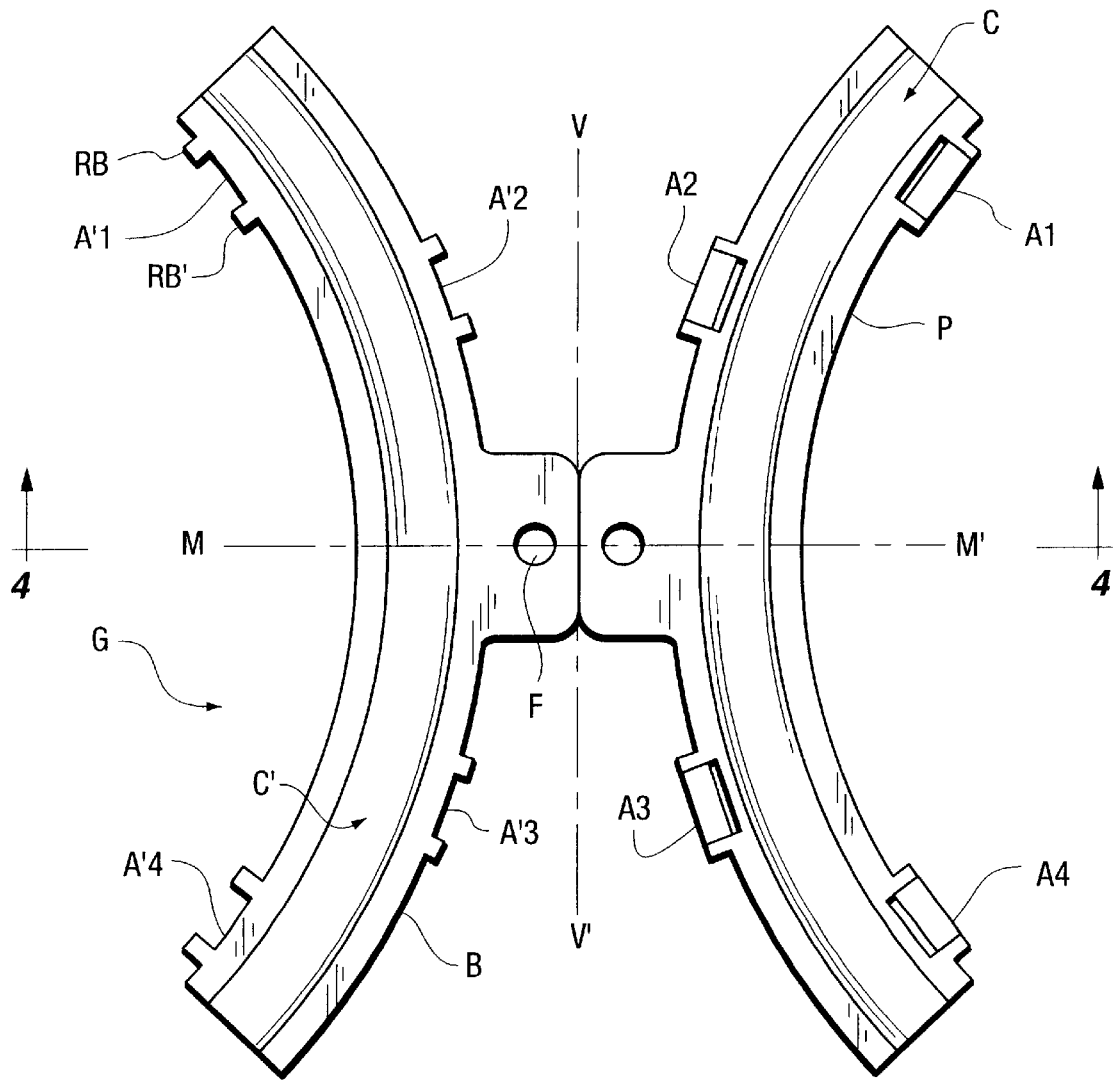
Figure 4:
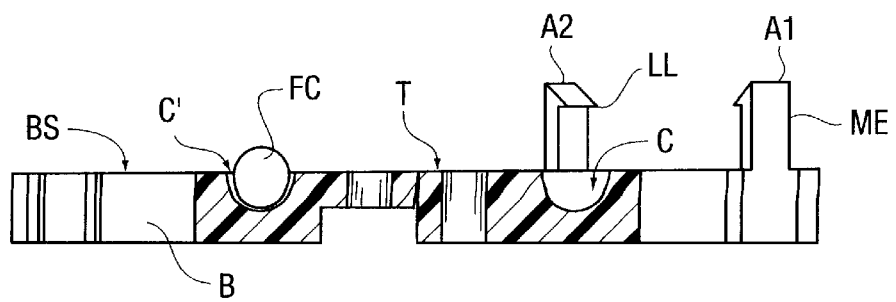

FIGS. 1 and 3 illustrate top plan views of two embodiments of the present universal cable guide G and FIGS. 2 and 4 illustrate end plan views of two embodiments of the present universal cable guide G in an illustrative embodiment of a simple fixed radius, two-dimensional curved guide. The present universal cable guide G comprises a body B of predetermined multi-dimensional (two-dimensional) shape, having at least one cable receiving channel C formed therein along its length L. The radius of curvature R of the cable receiving channel C is selected to correspond to a predetermined bending radius for the communication cable FC, which bending radius is greater than the minimum radius of curvature allowable for the selected communication cable FC that is placed in the universal cable guide G. The dimensions of the cable receiving channel C is selected to substantially correspond to the outer dimensions of the communication cable FC. The materials used and the thickness t of the walls of the universal cable guide G are selected to provide the desired degree of protection to the communication cable FC that is secured within the communication cable channel C. Thus, in an environment where the universal cable guide G primarily functions to guide the communication cable FC, this thickness t can be fairly small and fabrication material selection can be such that fairly inexpensive materials can be used in the manufacturing process. In contrast, a hostile environment, where the universal cable guide G must provide protection to the enclosed communication cable FC, mandates the selection of a thickness t and a fabrication material commensurate with the protection role required of the communication cable guide G. The material used to fabricate the universal cable guide G can be any material that can be molded and includes the class of plastic materials used for such a purpose, including but not limited to: polypropylene, polyethylene and the like.

While a semicircular shaped channel C is illustrated to receive a cylindrical-shaped communication cable FC, the cable receiving channel C can be fabricated to include communication cable retaining features to hold the communication cable in place in the cable receiving channel C while the cable protection element P is being positioned and fastened on body B. In particular, the size and shape of the cable receiving channel C can be selected to require the deformation of the exterior coating of the communication cable to insert the communication cable into the cable receiving channel C, thereby ensuring retention of the communication cable in the cable receiving channel C absent the application of exterior force on the communication cable to remove it from the cable receiving channel C. An example of such a feature is the forming of the cable receding channel C to encompass more than a semicircular extent, such that the exposed lips of the cable receiving channel C partially cover the top side of the communication cable FC when it is inserted in the cable receiving channel C.

A primary cable guide fastening element F is formed as an integral part of the body B and along an outer edge of the body B to receive fasteners (not shown) to secure the universal cable guide G to a surface (not shown), such as a building wall. In FIGS. 1 and 2, a plurality of apertures A1–A4 are formed along the length of the body B in a predetermined pattern to receive either fasteners to secure the universal cable guide G to a surface or to receive fasteners to secure a mating cable protection element P which can be placed on the top of the body B to enclose the communication cable FC within the cable receiving channel C and protect the communication cable FC from the ambient environment.

The mating cable protection element P can be formed, either as a separate piece, or a replica of the above-noted body B, or as an attachment to the above-noted body B, to cover the top surface of the body B. This cable protection element P can include apertures A'1–A'4 formed therein that match the plurality of apertures A1–A4 formed in the body B to enable fasteners to be used to secure the cable protection element P to the body B and to a surface, or cable protection element P can be formed with integral fasteners F1–F4 which mate in snap-fit fashion with the corresponding plurality of apertures A1–A4 formed in the body B. Obviously, the fasteners F1–F4 can alternatively be located on the body B with the corresponding apertures A'1–A'4 being located on the cable protection element P. The cable protection element P, as shown in FIGS. 1 and 2, include a cable receiving channel C' which corresponds in location and path to the cable receiving channel C formed in the body B of the universal cable guide G. Thus, the two cable receiving channels C and C' each form a segment of the resultant cable receiving channel which is formed by the affixing of the cable protection element P to the body B. The simple illustration of FIGS. 1 and 2 illustrate the two portions of the cable receiving channel C and C' each being semicircular in cross-section, so that when the cable protection element P is attached to the body B, the resultant channel is cylindrical in cross-section to conform to the outer dimensions of the communication cable FC.

A significant feature of the universal cable guide G is that the body B can be formed to be symmetric about the line M-M', such that two of the body B elements can be mated together to form a communication cable enclosing structure, with one body element performing the function of the cable protection element P, since the apertures A1–A4 align due to the symmetry of the body B around line M-M'. Alternatively, the body B and cable protection element P can be formed as a unitary structure, symmetric about the line V-V+ and connected together as shown in FIG. 1 at a hingeable point, such as the edge of the primary cable guide fastening element F located distal from body B. Thus, the entirety of the universal cable guide G can be molded in a single piece, thereby reducing the cost of manufacture. The molded piece can include the fasteners F1–F4 and all of the above-noted features.

An alternative method of fastening the body B to the corresponding cable protection element P is the use of clamp features A'1–A'4, each comprising a pair of ribs RB-RB' formed on an outer surface of the universal cable guide G. The clamp elements A1–A4, each comprise a clip-like feature formed on the body B of the universal cable guide G. The clamp features A1–A4 each comprise a rectangular shaped member ME which projects vertically up from the top surface T (as shown in FIG. 4) of the body B and having formed on the distal end thereof a lip LL which projects outward from the rectangular member R in the direction to engage the bottom surface BS of the cable protection element P. When the body B and cable protection element P are placed in contact together, for example by pivoting these two elements together about line V-V', the lip LL engages surface BS in well-known fashion to retain the two pieces together, The rectangular member R has sufficient flexibility to bend, thereby enabling lip LL to clear the outer edge of the cable protection element P.

Figure 5:
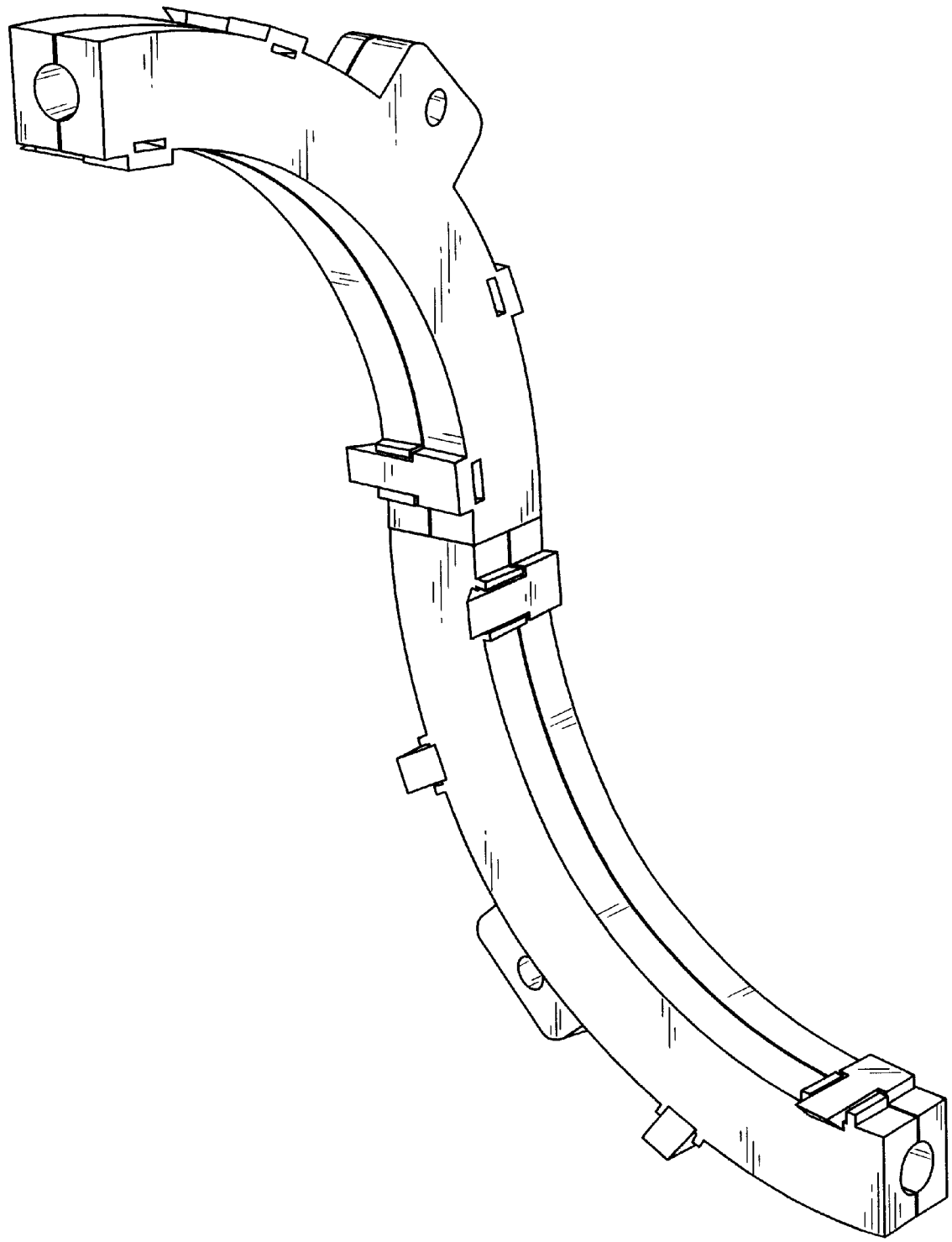
FIG. 5 illustrates a perspective view of a three-dimensional implementation of the universal cable guide.

The implementation of the universal cable guide illustrated in FIGS. 1 and 3 is that of a cable receiving channel C of constant radius R, although it is obvious that the cable receiving channel C defined to follow any selected path can be formed in body B. In addition, the two-dimensional nature of body B is illustrated for the purpose of simplicity of illustration, with a three-dimensional version of the universal cable guide G being capable of implementation as illustrated in FIG. 5. Thus, the three-dimensional cable guide shown in FIG. 5 is illustrative of the fact that the universal cable guide G can be formed to route the communication cable FC through any selected path, providing both guiding and protection functions.

SUMMARY

The present universal cable guide implements an inexpensive, and simple to use cable placement apparatus for guiding a communication cable through a predetermined multi-dimensional path. In particular, the present universal cable guide is formed as an integral structure which includes the cable guide aperture, mounting features and optional cable protection features.

We claim:

1. A cable guide apparatus for guiding a longitudinal element, comprising a cable, along a predefined multi-dimensional curvilinear path, comprising: a body having at least one cable receiving channel of predetermined dimensions formed in a major surface therein, said at least one cable receiving channel being substantially fitted to said at least one cable, said at least one cable receiving channel following a predefined multi-dimensional curvilinear path through said body, fastening means, formed as an integral part of said body, for providing a site for application of a fastener to secure said cable guide apparatus to a surface; cable protection means, mountable on said major surface, for covering said at least one cable receiving channel, and plurality of latching means formed in both said body and said cable protection means to enable said cable protection means to be rigidly secured to said body in both axial and radial directions with respect to said cable receiving channel.

2. The cable guide apparatus of claim 1 wherein said latching means comprises:
   a plurality of apertures formed in said body; and
   a like plurality of apertures formed in said cable protection means to enable the placement of said fastener through said apertures of said body and said cable protection means to secure said cable protection means to said body.

3. The cable guide apparatus of claim 1 wherein said plurality of latching means comprises;
   a plurality of apertures formed in said body; and
   a like plurality of projections formed in said cable protection means to enable the placement of said projections through said apertures of said body to secure said cable protection means to said body.

4. The cable guide apparatus of claim 1 wherein said plurality of latching means comprises:
   a plurality of apertures formed in said cable protection means; and
   a like plurality of projections formed in said body to enable the placement of said projections through said apertures of said cable protection means to secure said cable protection means to said body.

5. The cable guide apparatus of claim 1 wherein said fastening means comprises:
   at least one projection extending from said body and having an aperture formed therein to receive said fastener to enable securing said cable guide apparatus to said surface.

6. The cable guide apparatus of claim 1 wherein said body comprises:
   a unitary molded element, of dimensions to enable placement of a communication cable therein.

7. The cable guide apparatus of claim 6 wherein said cable protection means comprises:
   a unitary molded element having at least one cable receiving channel, formed in a major surface thereof and of dimensions to enable placement therein of an exposed portion of said communication cable placed in said cable receiving channel formed in said body.

8. The cable guide apparatus of claim 1 wherein said at least one cable receiving channel formed in said body and said at least one cable receiving channel formed in said cable protection means are both of semicircular cross-section.

9. The cable guide apparatus of claim 1 further comprising:

wherein said body comprises a unitary molded element having at least one cable receiving channel, of dimensions to enable placement of a communication cable therein; and wherein said cable protection means comprises a replica of said body to enable placement therein of an exposed portion of said communication cable placed in said cable receiving channel formed in said body.

* * * * *